United States Patent
Smith et al.

(10) Patent No.: US 11,531,353 B2
(45) Date of Patent: Dec. 20, 2022

(54) CALCULATING VELOCITY OF AN AUTONOMOUS VEHICLE USING RADAR TECHNOLOGY

(71) Applicant: Waymo LLC, Mountain View, CA (US)

(72) Inventors: L. Donnie Smith, Scotts Valley, CA (US); Timothy Campbell, Los Angeles, CA (US)

(73) Assignee: Waymo LLC, Mountain View, CA (US)

( * ) Notice: Subject to any disclaimer, the term of this patent is extended or adjusted under 35 U.S.C. 154(b) by 229 days.

(21) Appl. No.: 17/112,332

(22) Filed: Dec. 4, 2020

(65) Prior Publication Data

US 2021/0089047 A1   Mar. 25, 2021

Related U.S. Application Data

(63) Continuation of application No. 15/713,499, filed on Sep. 22, 2017, now Pat. No. 10,890,919.

(51) Int. Cl.
*G05D 1/02*   (2020.01)
*G01S 13/60*   (2006.01)
(Continued)

(52) U.S. Cl.
CPC ........... *G05D 1/0257* (2013.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS 6,121,916 A   9/2000   McDade
6,438,491 B1   8/2002   Farmer
(Continued)

FOREIGN PATENT DOCUMENTS

EP   2390680 A1   11/2011
JP   2015087352 A   5/2015

OTHER PUBLICATIONS

Singapore Patent Application No. 11202002385Q Official Action dated Nov. 29, 2021.
(Continued)

*Primary Examiner* — Todd Melton
(74) *Attorney, Agent, or Firm* — McDonnell Boehnen Hulbert & Berghoff LLP

(57) ABSTRACT

Examples relating to vehicle velocity calculation using radar technology are described. An example method performed by a computing system may involve, while a vehicle is moving on a road, receiving, from two or more radar sensors mounted at different locations on the vehicle, radar data representative of an environment of the vehicle. The method may involve, based on the data, detecting at least one scatterer in the environment. The method may involve making a determination of a likelihood that the at least one scatterer is stationary with respect to the vehicle. The method may involve, based on the determination being that the likelihood is at least equal to a predefined confidence threshold, calculating a velocity of the vehicle based on the data from the sensors. The calculated velocity may include an angular and linear velocity. Further, the method may involve controlling the vehicle based on the calculated velocity.

20 Claims, 10 Drawing Sheets

(51) Int. Cl.

| | | |
|---|---|---|
| *G01S 13/931* | (2020.01) | |
| *B60W 10/04* | (2006.01) | |
| *B60W 10/18* | (2012.01) | |
| *B60W 10/20* | (2006.01) | |
| *G01S 7/06* | (2006.01) | |
| *G01S 13/52* | (2006.01) | |
| *B60W 50/14* | (2020.01) | |
| *G05D 1/00* | (2006.01) | |
| *G08G 1/16* | (2006.01) | |
| *B62D 6/00* | (2006.01) | |
| *B62D 15/02* | (2006.01) | |
| *B62D 6/02* | (2006.01) | |

(52) U.S. Cl.
CPC ............... *B62D 6/002* (2013.01); *B62D 6/02* (2013.01); *B62D 15/024* (2013.01); *B62D 15/025* (2013.01); *G01S 7/06* (2013.01); *G01S 13/52* (2013.01); *G01S 13/60* (2013.01); *G01S 13/931* (2013.01); *G05D 1/0223* (2013.01); *G05D 1/0246* (2013.01); *G08G 1/16* (2013.01); *B60W 50/14* (2013.01); *B60W 2050/146* (2013.01); *B60W 2420/52* (2013.01); *G01S 2013/9318* (2020.01); *G01S 2013/9319* (2020.01); *G05D 1/0088* (2013.01); *G05D 1/0274* (2013.01); *G05D 2201/0213* (2013.01)

(56) References Cited

U.S. PATENT DOCUMENTS

| | | |
|---|---|---|
| 6,628,227 B1 | 9/2003 | Rao et al. |
| 7,289,059 B2 | 10/2007 | Maass |
| 8,855,848 B2 | 10/2014 | Zeng |
| 9,097,800 B1 | 8/2015 | Zhu |
| 9,162,682 B2 | 10/2015 | Hohm et al. |
| 9,201,421 B1 | 12/2015 | Fairfield et al. |
| 9,274,525 B1 | 3/2016 | Ferguson et al. |
| 9,423,498 B1 | 8/2016 | Brown |
| 9,470,777 B2 | 10/2016 | Arage |
| 9,600,768 B1 | 3/2017 | Ferguson |
| 9,610,961 B2 | 4/2017 | Breuing |
| 9,824,589 B1 | 11/2017 | Ramirez |
| 9,903,945 B2* | 2/2018 | Song ..................... G01S 13/931 |
| 10,127,462 B1 | 11/2018 | Pratt et al. |
| 10,267,907 B2* | 4/2019 | Shikatani ................ G01S 13/60 |
| 10,365,650 B2 | 7/2019 | Rust |
| 10,444,347 B2 | 10/2019 | Bialer et al. |
| 2005/0073433 A1 | 4/2005 | Gunderson et al. |
| 2011/0291876 A1 | 12/2011 | Hong et al. |
| 2015/0025786 A1 | 1/2015 | Hohm et al. |
| 2015/0198711 A1 | 7/2015 | Zeng et al. |
| 2015/0239472 A1 | 8/2015 | Sudou et al. |
| 2015/0314780 A1 | 11/2015 | Stenneth et al. |
| 2015/0369912 A1 | 12/2015 | Kishigami |
| 2016/0223661 A1 | 8/2016 | Song et al. |
| 2016/0349066 A1 | 12/2016 | Chung et al. |
| 2017/0248688 A1 | 8/2017 | Campbell et al. |
| 2018/0128916 A1 | 5/2018 | Bialer |
| 2019/0080612 A1 | 3/2019 | Weissman et al. |
| 2019/0250263 A1 | 8/2019 | Watanabe et al. |
| 2019/0258265 A1 | 8/2019 | Wiacker |

OTHER PUBLICATIONS

Rapp et al., "A Fast Probabilistic Ego-Motion Estimation Framework for Radar", 2015 European Conference on Mobile Robots (ECMR), Sep. 2015, pp. 1-6, (Year: 2015).
Notice of Allowance dated Jan. 30, 2020 for U.S. Appl. No. 15/713,500.
Non-Final Office Action dated Jul. 29, 2019 for U.S. Appl. No. 15/713,500.
Notice of Allowance dated Apr. 27, 2020 for U.S. Appl. No. 15/713,500.
Kellner et al., "Instantaneous Ego-Motion Estimation Using Multiple Doppler Radars", IEEE International Conference an Robotics and Automation, May 2014, pp. 1592-1597, (Year: 2014).
Grimm et al., "Detection of Moving Targets in Automotive Radar with Distorted Ego-Velocity Information", IEEE Microwaves, Radar and Remote Sensing Symposium, Aug. 2017, pp. 111-116, (Year: 2017).
International Search Report and Written Opinion of International Application No. PCT/US2018/051911 dated Jan. 23, 2019.
Non-Final Office Action dated Feb. 21, 2020 for U.S. Appl. No. 15/713,499.
Final Office Action dated Feb. 18, 2020 for U.S. Appl. No. 15/713,499.
Non-Final Office Action dated Oct. 10, 2019 for U.S. Appl. No. 15/713,499.
Final Office Action dated Jul. 20, 2020 for U.S. Appl. No. 15/713,499.
Notice of Allowance dated Sep. 18, 2020 for U.S. Appl. No. 15/713,499.
European Patent Application No. 18859621.7 Extended Search Report dated Apr. 21, 2019.
Canadian Patent Application No. 3,076,834 Examiner's Report dated Jun. 2, 2021.
Korean Patent Application No. 10-2020-7011387 Preliminary Rejection Notice dated Mar. 23, 2021.
Australian Patent Application No. 2020281035 Examiner's Report dated Oct. 19, 2021.
Canadian Patent Application No. 3076834 Official Action dated Mar. 22, 2022.

* cited by examiner ated velocity comprises an angular velocity and a linear velocity. And the operations may further comprise controlling the autonomous vehicle based on the calculated velocity.

In another aspect, the present application describes a computing system configured to control an autonomous vehicle. The computing system may comprise two or more radar sensors mounted at different locations on the autonomous vehicle, and a processor configured to perform operations. The operations may comprise while an autonomous vehicle is moving on a road, receiving, from two or more radar sensors mounted at different locations on the autonomous vehicle, radar data representative of a physical environment of the autonomous vehicle. The operations may also comprise based on the radar data, detecting at least one scatterer present in the environment. The operations may also comprise making a determination of a likelihood that the at least one scatterer is stationary with respect to the autonomous vehicle. The operations may further comprise in response to the likelihood being at least equal to a predefined confidence threshold, calculating a velocity of the autonomous vehicle based on the radar data from the two or more radar sensors, where the calculated velocity comprises an angular velocity and a linear velocity. And the operations may further comprise controlling the autonomous vehicle based on the calculated velocity.

In yet another aspect, a system is provided that includes a means for, while an autonomous vehicle is moving on a road, receiving, from two or more radar sensors mounted at different locations on the autonomous vehicle, radar data representative of a physical environment of the autonomous vehicle. The system may also include a means for, based on the radar data, detecting at least one scatterer present in the environment. The system may also include a means for making a determination of a likelihood that the at least one scatterer is stationary with respect to the autonomous vehicle. The system may further include a means for, in response to the likelihood being at least equal to a predefined confidence threshold, calculating a velocity of the autonomous vehicle based on the radar data from the two or more radar sensors, where the calculated velocity comprises an angular velocity and a linear velocity. And the system may further include a means for controlling the autonomous vehicle based on the calculated velocity.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
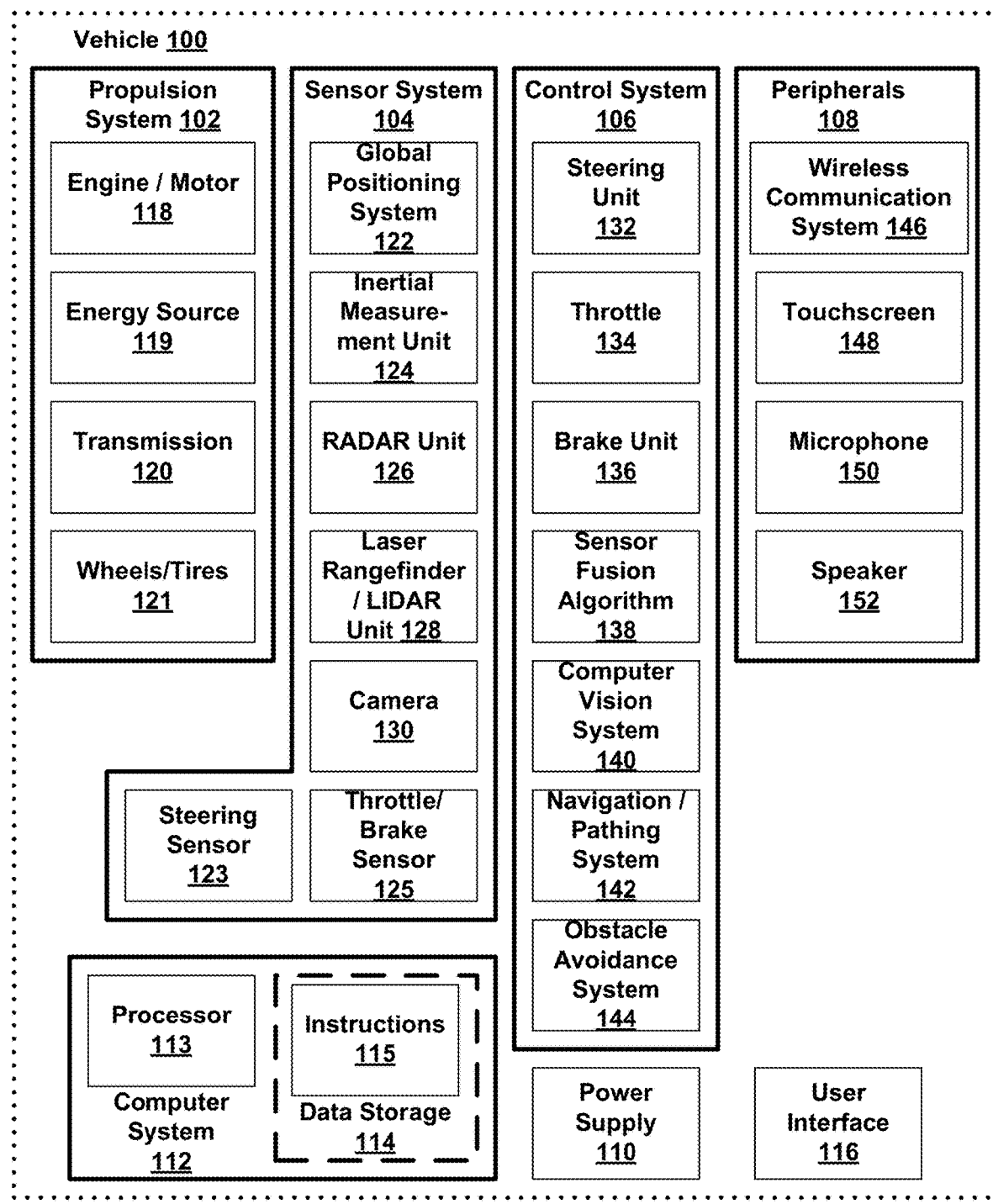
FIG. 1 is a functional block diagram illustrating an example vehicle.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

Moreover, the term "velocity," as used herein, may refer to a linear velocity and/or an angular velocity. Further, "velocity" may be a scalar quantity such as speed or a vector quantity, such as speed and angle.

A radar system for a vehicle may be configured to sense an environment of the vehicle and capture measurements of the vehicle's surroundings. For example, the radar system may measure the distance between the vehicle and another vehicle navigating in front of the vehicle. In some instances, a computing system of a vehicle or a remote system may use the radar data to determine control operations, such as route navigation, speed control, and obstacle avoidance. As a result, the radar system may enable a vehicle to operate in a partial or fully autonomous mode. For instance, an example radar system may also be configured to supplement other sensor systems of a vehicle within some implementations. In some implementations, the radar system may provide radar data to an interface that a driver may use to assist with navigating the vehicle.

In practice, many vehicle systems may implement Global Positioning System (GPS), inertial sensors (e.g., accelerometers and gyroscopes), wheel speed sensors, and/or other mechanisms to measure a velocity of a vehicle. Each one of these mechanisms may at times provide accurate measurements, but may have various disadvantages as well. For example, wheel speed sensors might lose traction and slip, even by a small amount, which may negatively impact the reliability of the sensor measurements. It may thus be desirable to implement a mechanism that can detect relative motion between the vehicle and the environment with higher accuracy and reliability. Additionally, systems such as GPS may only have an accuracy of approximately 4 meters. Thus, a GPS measurement may not be able to provide an accurate measurement of whether or not a vehicle is stopped.

Accordingly, disclosed herein are methods and systems relating to vehicle velocity calculation using radar technology—namely, using multiple radar sensors. Per the disclosure, a vehicle system may use radar data from two or more radar sensors to determine which objects in the environment are likely stationary, and then use these objects to calculate the linear and/or angular velocity of the vehicle to which the two or more radar sensors are attached.

For example, a vehicle system may be configured to receive, while the vehicle is moving on a road of travel, radar data acquired from two or more radar sensor mounted at two different locations (or with two different orientations) on the vehicle. The radar data may be representative of the environment of the vehicle. The system may then use the radar data to detect a scatterer present in the environment. Herein, a "scatterer" may refer to an object that scatters (i.e., reflects) radar waves when the radar waves encounters the object. Further, the system may be configured to determine a likelihood that the scatterer is stationary with respect to the vehicle. In some implementations, the system may be able to use coherent change detection to determine if a scatter is moving or not. Coherent change detection may use a sliding window and compare the phase of returns from the scatterer to determine movement. For example, a coherent processing interval (CPI) may be compared with another $CP_i$ (where i is the size of the sliding window) to measure the relative phase from the scatterer.

If the system determines that the likelihood of the scatterer being stationary is at least equal to a predefined confidence threshold, the system may responsively then calculate a velocity of the vehicle based on the radar data. The velocity may include a linear velocity and/or an angular velocity of the vehicle.

Once the system has calculated the velocity of the vehicle, the system may control the vehicle based on that velocity. For example, if the system determines that the calculated angular velocity meets or exceeds a predefined threshold, the system may cause the vehicle to adjust its steering angle, reduce its linear velocity, and/or reduce its angular velocity. Additionally or alternatively, if the system determines that the calculated linear velocity meets or exceeds a predefined threshold, the system may cause the vehicle to adjust its steering angle, reduce its linear velocity, and/or reduce its angular velocity. The system may take into account other factors to control the vehicle as well.

Furthermore, in practice, many vehicle systems may also implement encoders, inertial sensors, GPS, and/or other mechanisms to measure whether a vehicle is stationary or not. In some instances, such mechanisms may be configured to output that the vehicle is stationary in response to the mechanism having detected that the vehicle's measured velocity is zero and/or in response to the mechanism having detected that the vehicle's measured velocity is below a predefined detection threshold, such as 1 centimeter per second (cm/s). Encoders in particular may be configured to support motion detection in centimeters per second.

However, such mechanisms may have varying issues. As previously discussed, GPS, for example, may have high position noise and high latency. As another example, accelerometers may exhibit noise that might cause a strapdown inertial navigation system (e.g., an inertial sensor-based system where the sensors are strapped to the vehicle) or type of other inertial sensor system to detect motion even when the vehicle is stationary.

Accordingly, further disclosed herein are methods and systems relating to vehicle motion detection using radar technology. For example, in line with the discussion above, a vehicle system may be configured to receive radar data acquired from a radar sensor mounted on the vehicle, where the radar data is representative of the environment of the vehicle. The system may then use the radar data to detect a scatterer present in the environment.

Further, the system may be configured to determine a likelihood that the scatterer is stationary with respect to the vehicle, such as by using Doppler measurements, as discussed above. If the system determines that the likelihood of the scatterer being stationary is at least equal to a predefined confidence threshold, the system may then determine an indication that the vehicle is stationary, and then control movement of the vehicle based on the indication. For instance, the indication may take the form of a binary output (e.g., '0' if not stationary, '1' if stationary), and if the binary output indicates that the vehicle is stationary, the system may configure itself to ignore other movement sensor readings, such as inertial sensor readings, but may reconfigure itself to take inertial sensor readings into account once the binary output indicates that the vehicle is no longer stationary.

In practice, objects in the environment that have a threshold high likelihood of being stationary scatterers may appear in the radar data as clutter. Thus, the methods and systems described herein may differ from known radar implementations in that many known radar implementations involve removing or otherwise disregarding clutter that appears in radar data. By contrast, these methods and systems may involve isolating or otherwise taking into consideration clutter in the radar data and using the clutter as a basis for calculating a velocity of the vehicle and/or determining whether the vehicle is stationary or not.

The described methods and systems may provide other improvements to radar technology and/or motion sensing/measurements as well. For example, airborne-based radar systems may transmit radar waves at a low rate and at greater distances (e.g., thousands or tens of thousands of meters) in order to sense objects on the ground, and attempts to sense such objects on the ground may often result in aliasing or other undesirable effects. In addition, due to the low rate, such radar systems might not be able to isolate a single scatterer in radar data. By contrast, the present methods and systems involve transmitting radar waves at a higher rate and at shorter distances (e.g., hundreds of meters or less) in order to sense objects.

Operations described herein with regard to radar-based vehicle motion detection in particular may facilitate motion detection with higher accuracy, higher sensitivity, and lower latency, among other possible improvements. By way of example, such operations may facilitate motion detection in millimeters per second—namely, outputting that the vehicle is stationary in response to detecting that the vehicle's measured velocity is below a predefined threshold of approximately 1 millimeter per second (mm/s)—thereby providing about ten times the precision of existing motion detection mechanisms.

Although implementations described herein are generally discussed with regard to radar systems, it should be noted that the vehicle velocity calculation and/or vehicle motion detection operations discussed could be performed using LIDAR systems as well, additionally or alternatively to using radar. By way example, the vehicle system may use at least one frame of LIDAR data to detect at least one scatterer and then determine a likelihood that the at least one scatterer is stationary, perhaps only considering LIDAR data, or perhaps considering LIDAR data in combination with other types of data (e.g., radar, images, maps, and/or remote assistance). For instance, the vehicle system may receive multiple frames of LIDAR data from one or more LIDAR sensors and determine to what extent there has been a change in the portions of the LIDAR data that is estimated to be associated with at least one scatterer. The vehicle system may then determine whether the at least one scatterer is stationary based on how the determined extent of change compares with a predefined change threshold. As another example, the vehicle system may use at least one hybrid LIDAR/Doppler sensor to acquire LIDAR-based Doppler measurements for scatterer candidates, and then use those measurements in manners similar to those described above in order to determine various information, such as (i) the likelihood that the scatterer candidates are stationary, (ii) whether the vehicle is stationary, and/or (iii) a velocity of the vehicle.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some implementations, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112, data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100

(e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/LIDAR 128, camera 130, steering sensor 123, and throttle/brake sensor 125, among other possible sensors. In some implementations, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some implementations, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi™ or other possible connections. Wireless communication system 146 may also communicate directly with a device using an infrared link, Bluetooth®, or ZigBee®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
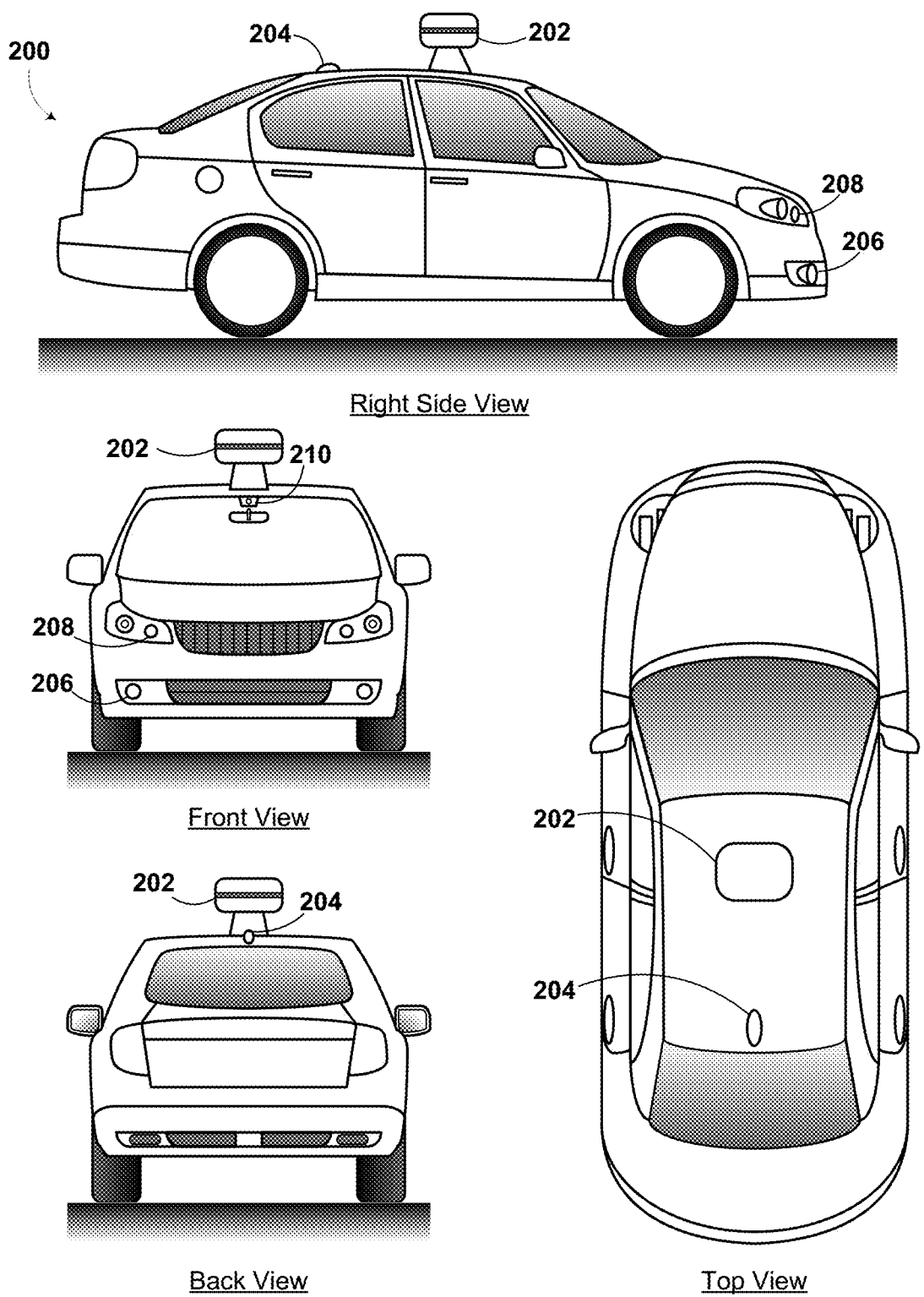
FIG. 2 depicts an example physical configuration of a vehicle.

FIG. 2 depicts an example physical configuration of vehicle 200, which may represent one possible physical configuration of vehicle 100 described in reference to FIG. 1. Depending on the embodiment, vehicle 200 may include sensor unit 202, wireless communication system 204, radio unit 206, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth® and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around the vehicle 200. The movable mount of sensor unit 202 may also be moveable in a scanning fashion within a particular range of angles and/or azimuths.

In some implementations, sensor unit 202 may include mechanical structures that enable sensor unit 202 to be mounted atop the roof of a car. Additionally, other mounting locations are possible within various examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking view with respect to vehicle 200, but other mounting locations (including movable mounts) and viewing angles of camera 210 are possible within implementations. In some examples, camera 210 may correspond to one or more visible light cameras. Alternatively or additionally, camera 210 may include infrared sensing capabilities. Camera 210 may also include optics that may provide an adjustable field of view.

Figure 3A:
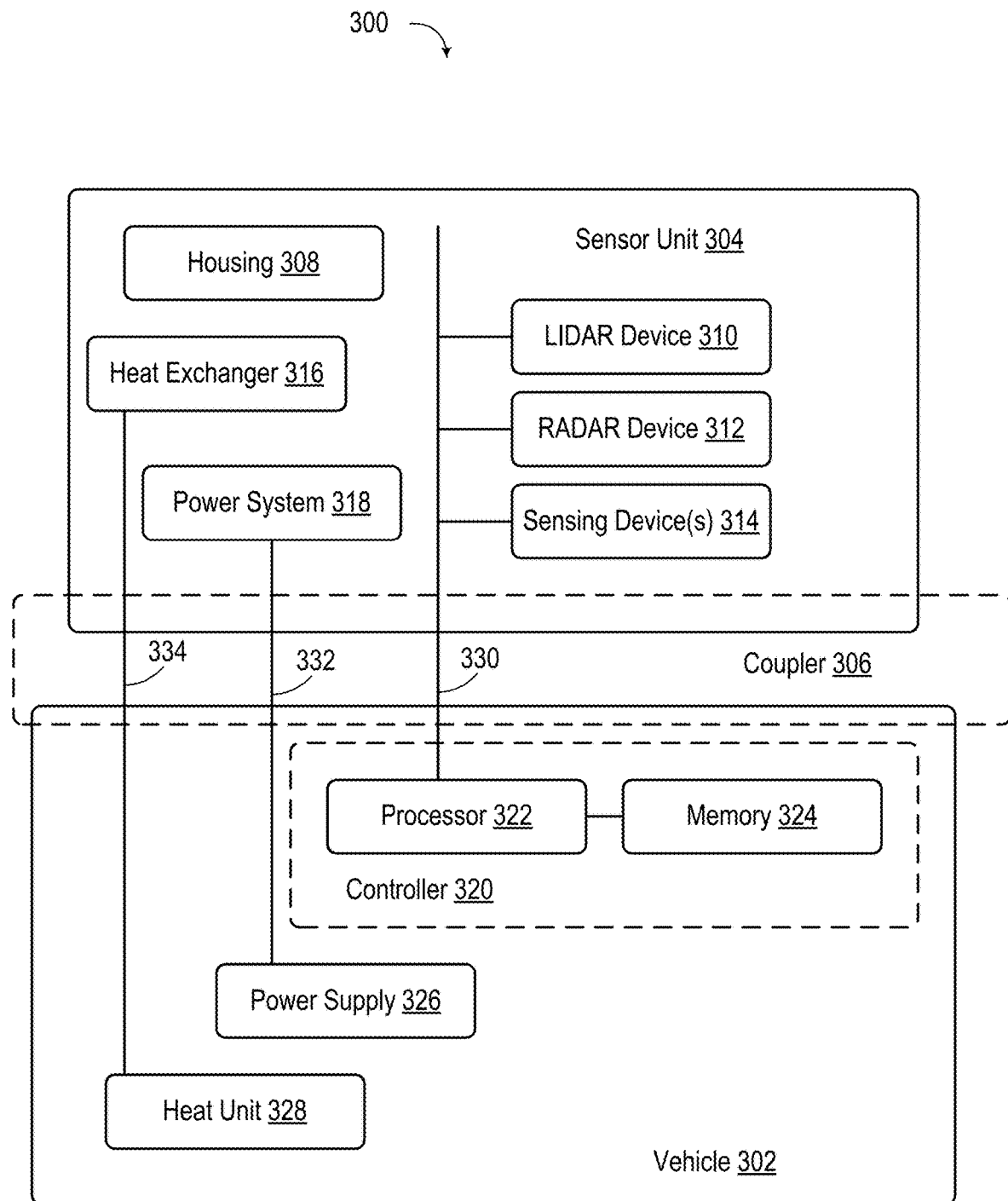
FIG. 3A illustrates a block diagram of a sensing system including a coupler.

FIG. 3A illustrates a block diagram of a sensing system 300 including a coupler 306. The coupler 306 may be configured to couple a sensor unit 304 to a vehicle 302. The coupler 306 may enable the sensor unit 304 to be removeably coupled to the vehicle 302. In some examples, as previously discussed, a vehicle may be sold as "autonomous ready." An "autonomous ready" vehicle may be able to perform autonomous driving functions, but may lack some of the sensors used to perform autonomous driving functions. However, the vehicle 302 may include a coupler 306 that allows a sensor unit 304 to be coupled to the vehicle 302 later. For example, a person may purchase an "autonomous ready" vehicle and may later decide to either buy or rent a sensor unit 304 in order to provide the vehicle with autonomous functionality. In some examples, the coupler 306 may be a universal, non-manufacturer specific standardized design. That is, a sensor unit 304 may be coupled to any manufacturer's vehicle that is "autonomous ready."

In one example, an "autonomous ready" vehicle 302 may include a controller 320 that includes a processor 322 and a memory 324. The "autonomous ready" vehicle 302 may also include a power supply 326 and a heat unit 328. The controller 320 may be similar or the same as the computer system 112 of FIG. 1. The controller 320 may be configured to receive sensor data from the sensor unit 304 by way of a data bus 330 that passes through the coupler 306. The controller 320 may be able to determine control instructions for autonomous control of the vehicle based at least in part on the sensor data. The controller 320 may also store some data and/or control instructions in memory 324. In some examples, the controller 320 may be a fully-functional controller that can perform all of the sensor processing on its own.

Additionally, the vehicle 302 may include a power supply 326. The power supply 326 may be similar or the same as power supply 110 described with respect to FIG. 1. The power supply 326 may provide a voltage (e.g., 12 volts) that supplies power to various components of the vehicle 302. In some instances, the power supply may be configured to provide other voltages than 12 volts. The power supply may be coupled to the sensor unit 304 by way of a power bus 332 that goes through the coupler 306. Additionally, the vehicle 302 may include a heat unit 328. The heat unit 328 may be a radiator or other unit configured to provide cooling of various components of vehicle 302. In some various examples, the heat unit 328 may provide cooling based on air and/or liquid cooling. The heat unit 328 may be coupled to the sensor unit 304 by way of a heat bus 334 that passes through the coupler 306.

The sensor unit 304 may contain various sensors, such as a LIDAR device 310, a RADAR device 312, and other sensing devices 314 (such as optical, acoustic, and/or other sensing devices) located in a housing 308. The housing 308 may be configured to couple to the vehicle 302 by way of the coupler 306. The sensors may be similar to those described throughout. The sensors may be coupled to the previously-described data bus that communicates sensor data to the controller 320 of the vehicle 302 through the coupler 306. The sensor unit may also include a heat exchanger 316. The heat exchanger 316 may be configured to provide cooling to the various sensors and components of the sensor unit 304. The heat exchanger 316 may use liquid cooling to remove heat from the various sensor devices during their operation. For example, the LIDAR device 310 and/or the RADAR device 312 may generate heat during the operation. In order to keep the devices cool and to prevent their failures, the heat exchanger 316 may be able to remove heat from the device (s). Additionally, as previously discussed, in order to remove the accumulated heat from the sensor unit 304, the heat unit 328 may be coupled to the sensor unit 302 by way of a heat bus that passes through the coupler 306. liquid, air, or other substance may flow through the heat bus to remove heat from the sensor unit.

Figure 3B:
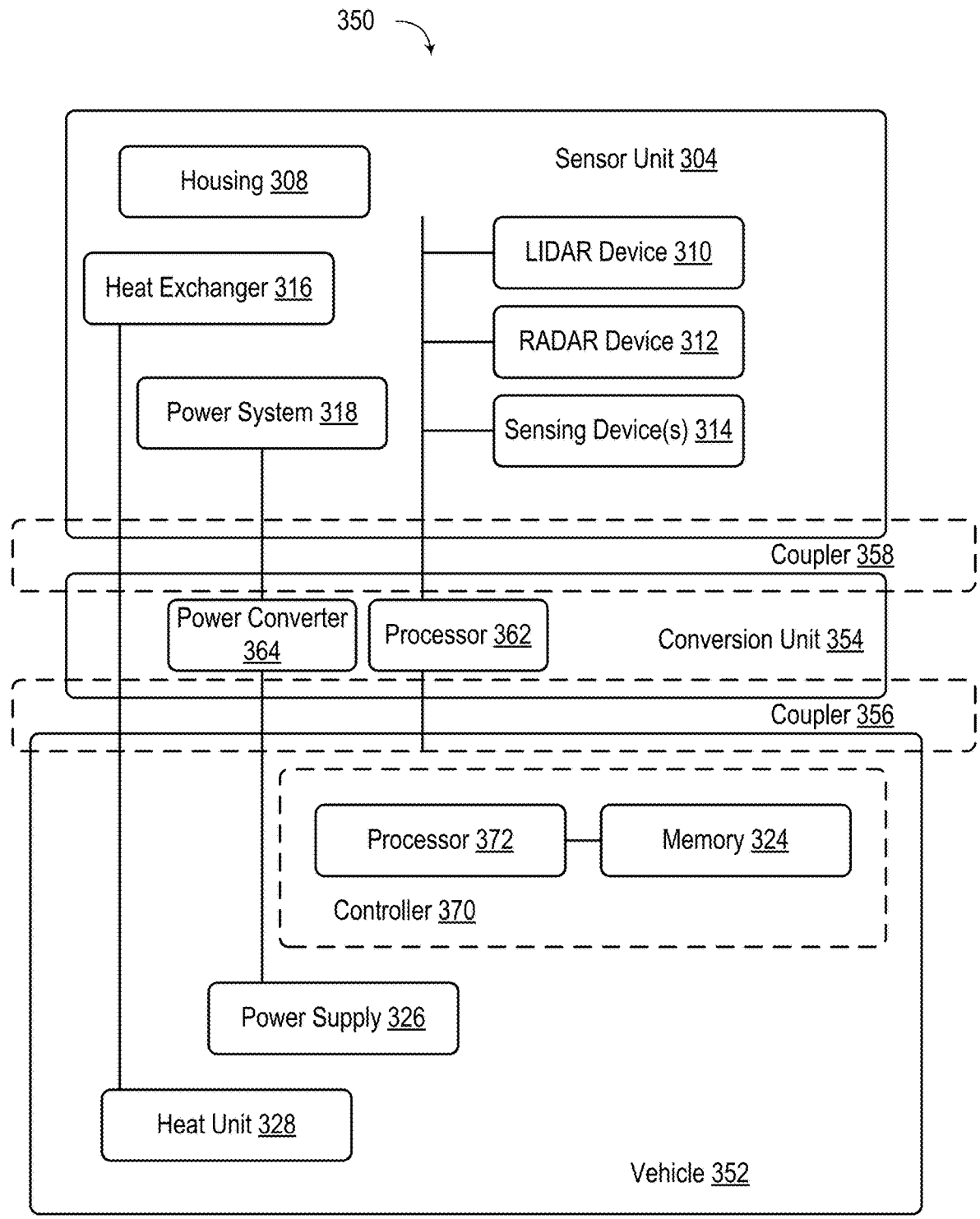
FIG. 3B illustrates a block diagram of another sensing system including a coupler.

FIG. 3B illustrates a block diagram of another sensing system 350 including a coupler 356. In some examples, an "autonomous ready" vehicle may be able to perform autonomous driving functions, but may lack both some of the sensors used to perform autonomous driving functions as well as some of the processing power to perform autonomous driving functions. Similar to the example discussed with respect to FIG. 3A, a person may purchase an "autonomous ready" vehicle 352. However, the "autonomous ready" vehicle 352 of FIG. 3B may be a lower cost vehicle than that of FIG. 3A. The lower cost "autonomous ready" vehicle 352 may not have sufficient processing capabilities for autonomous driving calculations. Thus, the controller 370 may not be able to make the determinations required based on sensor data to autonomously drive the vehicle. However, the controller 370 and processor 372 may be able to perform some control functions of the vehicle.

Similar to vehicle 302 of FIG. 3A, the vehicle 352 may include a coupler 356 that allows other devices to be coupled to the vehicle 352 later. For example, a person may purchase the "autonomous ready" vehicle 352 and later decide to either buy or rent a sensor unit 304 to provide the vehicle with autonomous functionality. As previously discussed, the coupler 356 may be a universal, non-manufacturer specific standardized design. That is, a sensor unit 304 may be coupled to any manufacturer's vehicle that is "autonomous ready."

In order to provide autonomous vehicle control, sensing system 350 may include a conversion unit 354. The conversion unit 354 may couple to the vehicle 352 by way of coupler 356 and to the sensor unit 304 by way of coupler 358. In some further examples, the conversion unit 354 may be integrated within the sensor unit 304 and the coupler 358 may be omitted.

The conversion unit 354 may perform several functions to enable the vehicle 352 to perform autonomous driving functions. In some examples, the conversion unit 354 may include a processor 362. The processor 362 may be configured to receive the sensor data from the data bus of the sensor unit. The processor 362 may also receive data from the controller 370 of the vehicle 352. The controller 370 may communicate signals related to the vehicle 352 to the processor 362. The controller 370 may be in communication and/or provide a connection to a control bus of the vehicle 352 to the processor 362. The bus of the vehicle 352 may be a Controller Area Network (CAN) bus in communication with an on-board vehicle diagnostic (OBD) system. The CAN bus may enable various units of the vehicle 352 to communicate with each other. In some other examples, the communication bus may be a bus other than a CAN bus.

The processor 362 may be able to interpret sensor data from sensor unit 304 and vehicle data from vehicle 352 to determine a control scheme for the autonomous operation of the vehicle 352. The processor 362 may further be able to determine control signals for the vehicle 352. The processor 362 may communicate the control signals to the controller 370 of the vehicle 352 in order to autonomously operate the vehicle 352. Therefore, the processor 362 of the conversion unit 354 may perform autonomous driving calculations that would otherwise be performed by a processing unit of a vehicle. Thus, the processor 362 may be able to tap into the CAN bus (or other data bus) of the vehicle to provide autonomous operation.

The conversion unit 354 may also contain a power converter 364. The power converter 364 may be able to convert a vehicle voltage to one or more voltages to power the various components of the sensor unit 304. The power converter 364 may receive one or more voltages from the vehicle 352 and convert them to one or more output voltages to the sensor unit 304.

Figure 4A:
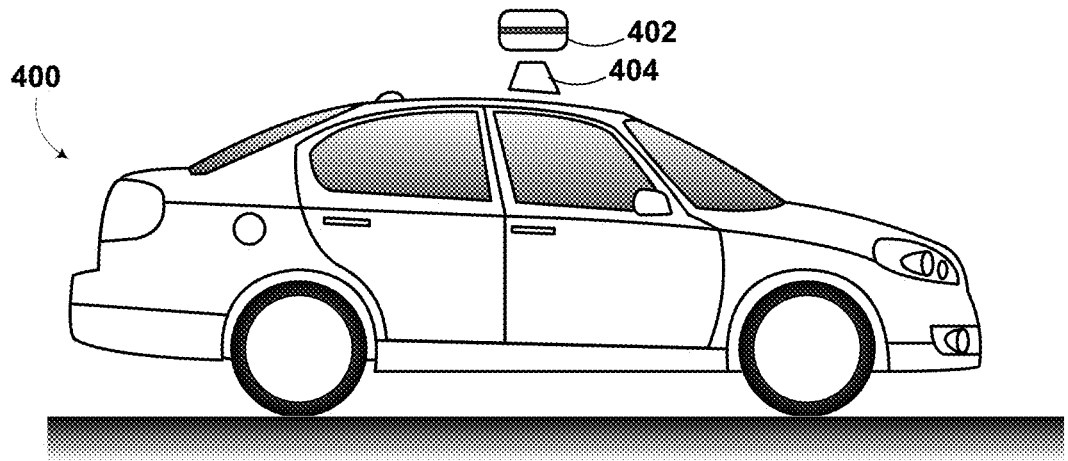
FIG. 4A depicts a physical configuration of a vehicle.
Figure 4B:
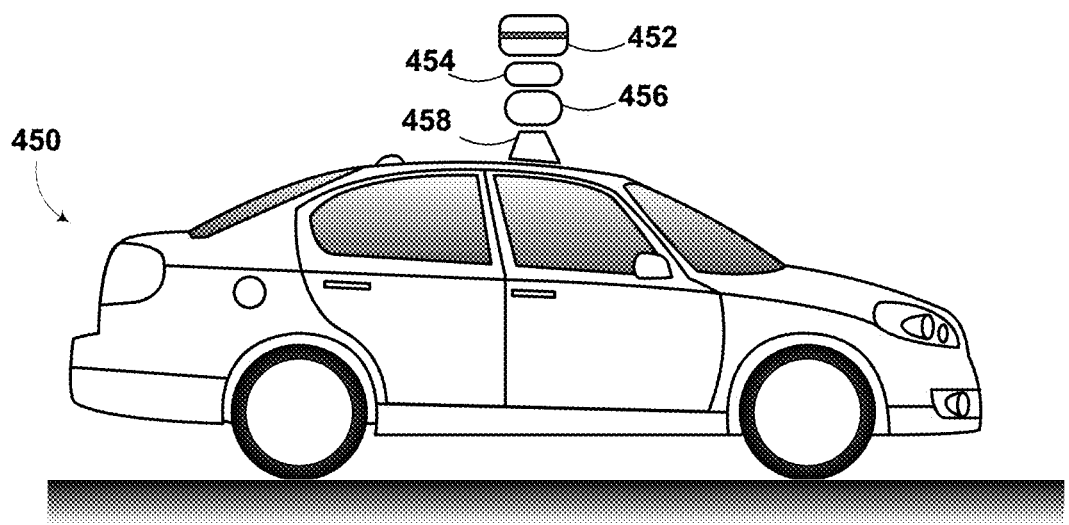
FIG. 4B depicts a physical configuration of a vehicle.

FIG. 4A depicts a physical configuration of a vehicle 400. The vehicle 400 may have a sensor unit 402 coupled to the top of the vehicle. The vehicle 400 may also have a coupler 404 that couples the sensor unit 402 and the vehicle 400. FIG. 4B depicts a physical configuration of a vehicle 450. The vehicle 450 may have a sensor unit 452 coupled to a conversion unit 456 by way of a first coupler 454. The conversion unit 456 may be coupled to the top of the vehicle 450 by a coupler 456.

In line with the discussion above, radar systems may be arranged in various ways and may include one or more radar sensors. Each radar sensor described herein may be coupled to or otherwise mounted on a vehicle at a variety of locations, including but not limited to, a roof of the vehicle, behind a headlight, in front of a headlight, on a side mirror, near the bottom of the windshield, co-located with another sensor (e.g., coupled to another sensor), on top of the trunk, on a hood, on a bumper, on a hood ornament, and/or proximate to a license plate. In some implementations, a given radar sensor may be mounted at a location in an interior of the vehicle, such as the dashboard of the vehicle.

The following figures illustrate representative examples of vehicle radar systems, radar sensor locations, and radar system usage.

Figure 5:
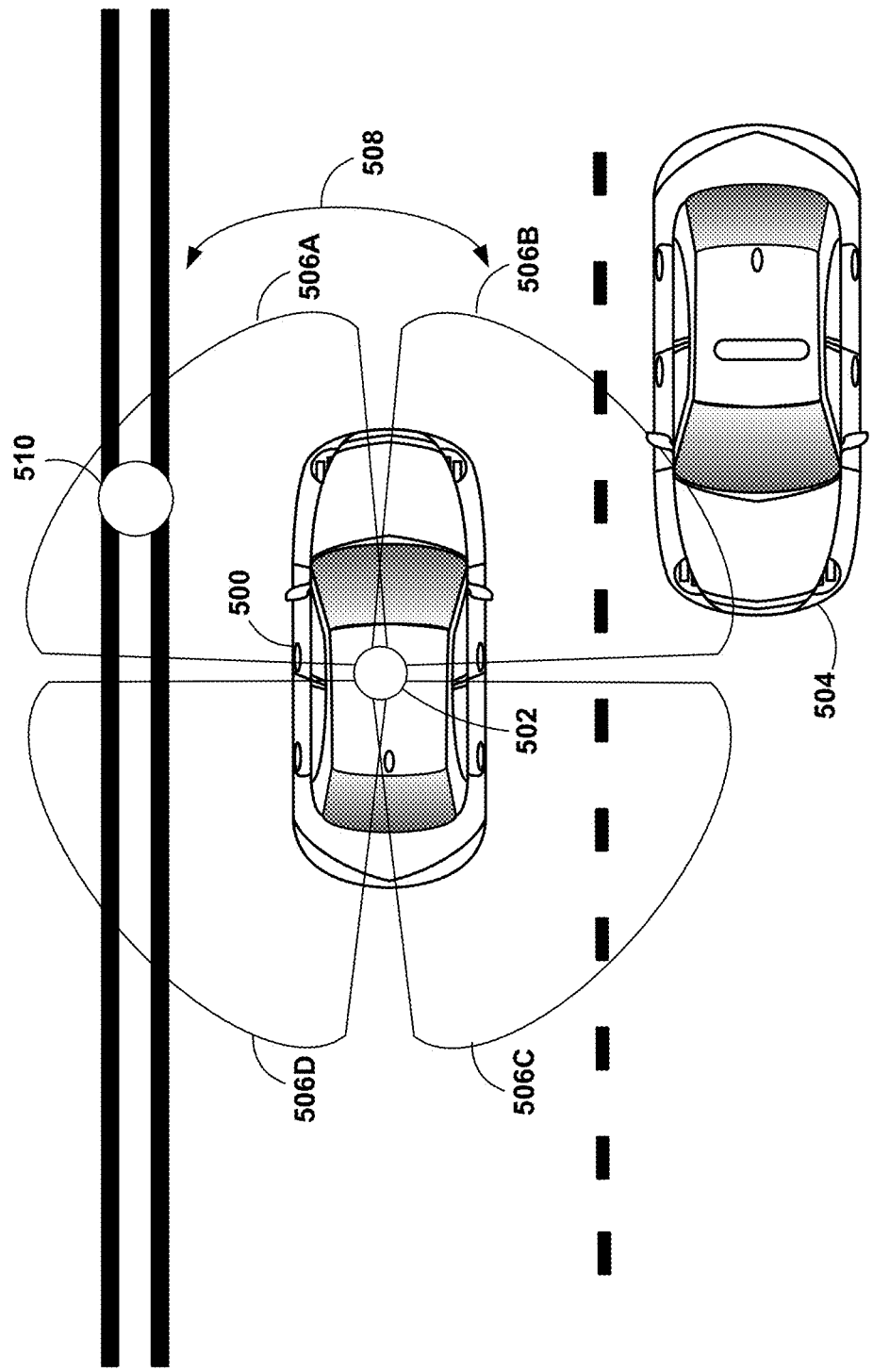
FIG. 5 illustrates an example scenario of a vehicle using a radar system.

FIG. 5 illustrates an example scenario of a vehicle 500 using a radar system 502. Radar system 502 represents an example vehicle radar system, such as RADAR device 312 shown in FIG. 3A, or one or more radar sensors included in sensor unit 202 shown in FIG. 2. As such, radar system 502 may include the various components described herein arranged to obtain measurements of the surrounding environment.

Vehicle 500 may in some scenarios operate in an autonomous mode. As vehicle 500 navigates the environment, radar system 502 may transmit and receive radar signals that provide measurements of the surrounding areas nearby vehicle 500. As a result, radar system 502 may enable a computing system of vehicle 500 to utilize the radar data to determine a position of road elements (e.g., curb, medians) and/or other objects relative to a position of vehicle 500. For example, radar system 502 may capture and provide measurements that detect other vehicles (e.g., vehicle 504), signs, cyclists, pedestrians, and traffic signals, among other possible objects. In particular, as shown in FIG. 5, a computing system may receive measurements from radar system 502 that indicates the presence of another vehicle 504 located in long range coverage sections covering areas positioned relative to vehicle 500.

In further implementations, radar system 502 may detect multiple vehicles or other types of objects at the same time. A computing system of vehicle 500 may determine control operations for vehicle 500 based on measurements from radar system 502 and possibly other sensors that indicate the presence of nearby objects. In some instance, the computing system may develop future navigation operations for vehicle 500 based on detecting objects in the distance using radar signals from radar system 502.

During the operation of radar system 502, the radar system 502 may have four different receive beams 506A-506D. These beams may be configured to rotate 508 either clockwise or counterclockwise. While the beams rotate, the may be able to receive radar reflections from scatterers located near the vehicle, such as another car 504, or a stationary object 510 (e.g., a stop sign). In some further examples, the radar system 502 may also be configured to transmit an omnidirectional radar signal. In some instances, it may be desirable to transmit with a single omnidirectional radar signal and receive radar signals with four different radar units in order to minimize hardware requirements. Some example radar chips may include one transmission channel and four reception channels. Therefore, a single radar chip could perform the transmission and reception in this instance.

The omnidirectional radar signal may reflect off various objects and be received by the radar unit by way of receive beams 506A-506D. In some other examples, receive beams 506A-506D may also represent transmit beams as well. In some examples, the radar system 502 may transmit multiple narrow beams, instead of an omnidirectional beam. In yet some further examples, the radar system could generally have multiple omnidirectional transmissions antennas dispersed spatially. By providing a spatial separation between omnidirectional transmission elements, the radar system may be able to provide sufficient information to separate azimuth and Doppler coupling. As previously discussed, separating the azimuth and Doppler coupling could be beneficial for both Synthetic Aperture Radar (SAR) and Moving Target Indication (MTI) operating modes.

Figure 6:
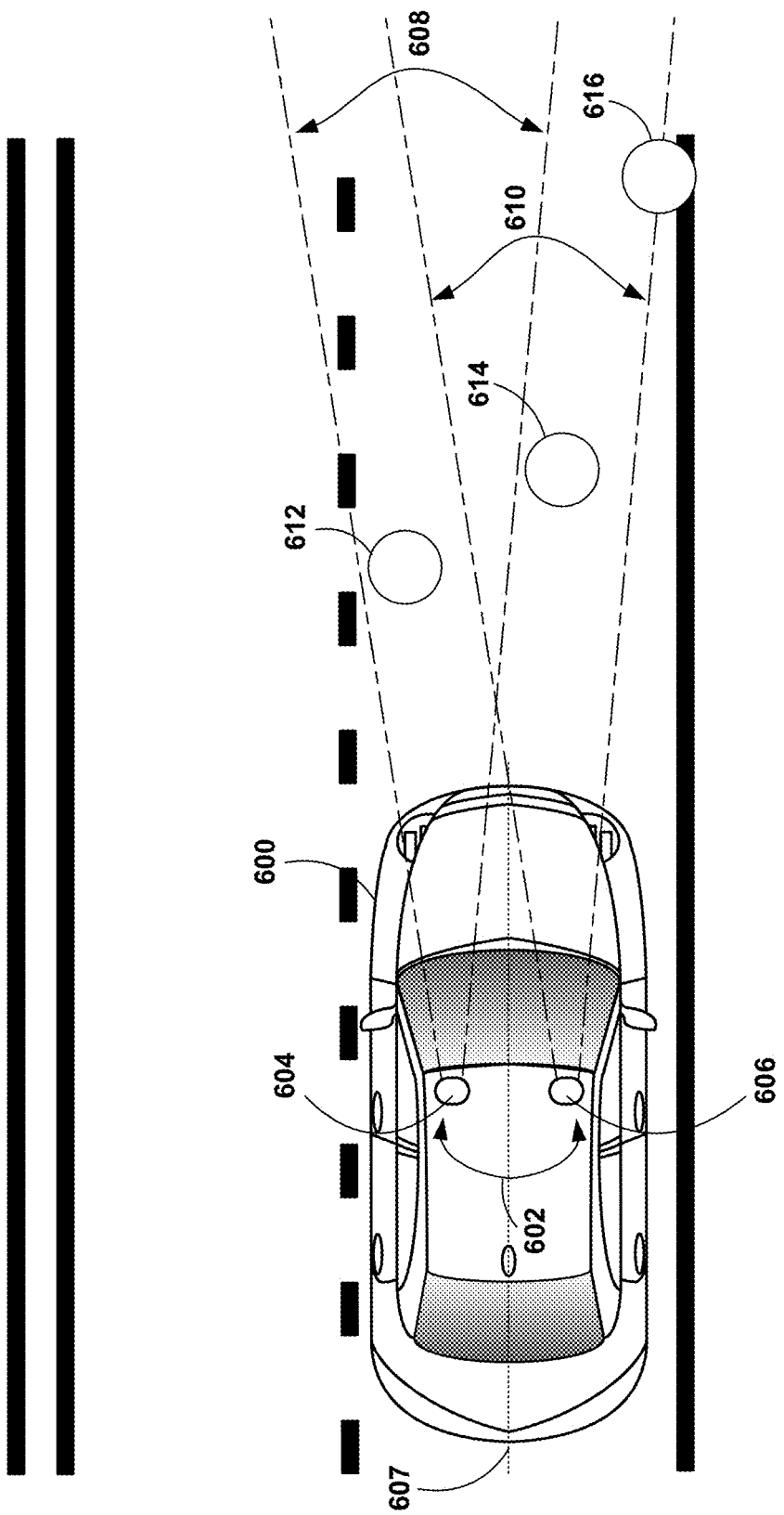
FIG. 6 illustrates an example scenario of a vehicle using a radar system.

FIG. 6 illustrates an example scenario of a vehicle 600 using a radar system 602. Vehicle 600 may operate in an autonomous mode.

Radar system 602 represents an example vehicle radar system, such as radar system 502 shown in FIG. 5, RADAR device 312 shown in FIG. 3A, or one or more radar sensors included in sensor unit 202 shown in FIG. 2. As such, radar system 502 may include the various components described herein arranged to obtain measurements of the surrounding environment. Further, radar system 602 may be configured to perform operations similar or identical to that of radar system 502 discussed above.

Radar system 602 may include at least two radar sensors, such as radar sensors 604 and 606. Each of radar sensors 604 and 606 may be located at a respective distance from a geometric centerline 607 of the vehicle. For example, as shown, radar sensors 604 and 606 may be equidistant from the geometric centerline 607.

During operation of radar system 602, radar sensor 604 may have field of view 608 and radar sensor 606 may have field of view 610. Each of these fields of view may correspond to a region of the environment over which a respective radar sensor may send and receive signals to acquire radar data and thereby detect objects. In other implementations, these fields of view may not be limited to regions in front of the vehicle and/or may be expanded or scaled down. Further, in some implementations, radar system 602 may be a component of a larger sensor unit that might include one or more cameras and/or other types of sensors. The radar system 602 and these other sensors may thus work in conjunction to acquire environment data, detect scatterers in the environment, and facilitate vehicle operation.

In the scenario illustrated in FIG. 6, vehicle 600 may use radar system 602 to obtain radar data representative of various objects (e.g., scatterers) in the environment. For example, as shown, scatterer 612 may be located within field of view 608 and scatterer 614 may be located within field of view 610. Further, scatterer 616 may be located partially within field of view 610.

Figure 7:
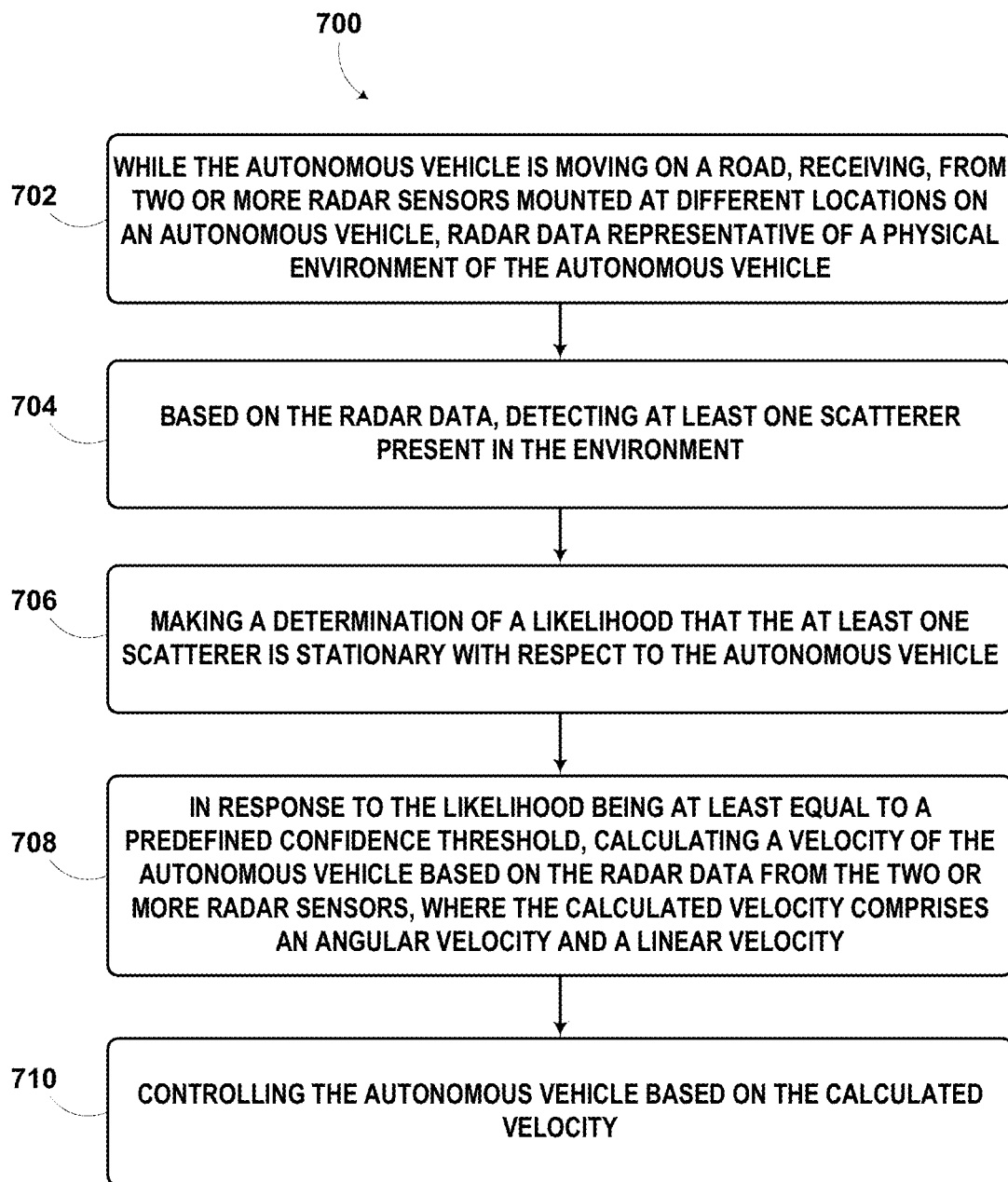
FIG. 7 is a flow chart of a method, according to an example implementation.

FIG. 7 is a flowchart of an example method 700 for vehicle velocity calculation using radar technology. Method 700 represents an example method that may include one or more operations, functions, or actions, as depicted by one or more of blocks 702, 704, 706, 708, and 710, each of which may be carried out by any of the systems shown in FIGS. 1, 2, 3A, 3B, 4, 5, and 6, among other possible systems. Those skilled in the art will understand that the flowchart described herein illustrates functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may cause a system to perform one or more blocks of method 700.

At block 702, method 700 includes while an autonomous vehicle is moving on a road, receiving, from two or more radar sensors mounted at different locations on the autonomous vehicle, radar data representative of a physical environment of the autonomous vehicle.

As noted above, each of the two or more radar sensors may be mounted at a variety of possible locations inside or outside the vehicle, such as a roof of the vehicle, the dashboard, behind a headlight, etc.

In some implementations, the radar data may include Doppler measurements, or other types of measurements, captured in at least one frame. Herein, a "frame" may refer to an interval of time over which a given one or more radar sensors acquire radar data. In some implementations, the radar data may include radar data acquired over two or more consecutive frames. For instance, a radar sensor may acquire radar data over two consecutive intervals, each 130 milliseconds (ms) in duration. In other implementations, the radar data may include radar data acquired over two or more nonconsecutive frames.

Further, in some implementations, the radar data may include measurements (Doppler, or another type) acquired simultaneously by the two or more radar sensors. Additionally or alternatively, the radar data may include measurements acquired by the two or more radar sensors at different points in time.

In some implementations, the radar data may take the form of, or be processed by the vehicle system to produce, a range-Doppler map having one axis representing object distance from the radar sensor, and another axis representing Doppler measurements.

At block 704, method 700 includes based on the radar data, detecting at least one scatterer present in the environment.

In some implementations, the act of detecting the at least one scatterer present in the environment may involve processing the radar data to isolate the at least one scatterer from a remainder of the radar data. To facilitate this in practice, the vehicle system may implement a variety of different techniques, some of which may be used to classify scatterers in the radar data as stationary or non-stationary. For example, the vehicle system may classify scatterers as stationary or non-stationary using an expectation maximization algorithm. Other examples are possible as well.

At block 706, method 700 includes making a determination of a likelihood that the at least one scatterer is stationary with respect to the autonomous vehicle.

In some implementations, the act of making the determination of the likelihood that the at least one scatterer is stationary with respect to the vehicle based on the radar data may involve making an absolute determination (e.g., a binary determination without considering a level of confidence) that the at least one scatterer is stationary with respect to the vehicle. In other embodiments, that act may involve determining whether the at least one scatterer is stationary on a confidence level basis. For instance, for a given scatterer candidate, the vehicle system may be configured to determine a confidence level indicative of how likely it is that the scatterer is stationary with respect to the vehicle. Herein, a scatterer that has been determined in absolute to be stationary, or determined to be stationary with a threshold high confidence level, may be referred to as a "stationary scatterer."

The vehicle system may be configured to determine such a confidence level for a given scatterer based on various factors. In some implementations, for instance, the vehicle system may take into account image data received from at least one camera mounted on the vehicle when determining the confidence level for whether the scatterer is stationary. For example, the vehicle system may be configured to identify an object in an image or series of images captured by a camera, and may have stored information indicating that the object is typically a stationary object or a non-stationary object. As a more particular example, the vehicle system may determine with a particular confidence level that an object in an image is a stop sign, which the vehicle system may determine to be a stationary object. As another particular example, the vehicle system may determine with a particular confidence level that an object in an image is a car, but might not necessarily determine with threshold high confidence (e.g., confidence greater than a predefined threshold of 75, on a scale of 0 to 100) that the car is stationary or not. Other examples are possible as well.

Additionally or alternatively, in some implementations, the vehicle system may take into account optical data received from at least one LIDAR sensor mounted on the vehicle when determining the confidence level for whether the scatterer is stationary. For example, at least one LIDAR sensor may be configured to use ultraviolet, visible, or infrared light at various wavelengths to image scatterers in the environment. Different types of scattering may be used for different LIDAR applications. Further, suitable combinations of wavelengths can allow for remote mapping of objects by looking for wavelength-dependent changes in intensity of reflected signals. Still further, three-dimensional (3D) imaging may be achieved using both scanning and non-scanning LIDAR systems to produce a 3D point cloud, which a LIDAR unit of the vehicle system may then output as a data file. The point cloud can then be used to identify and visualize scatterers in the environment. In some scenarios, the vehicle system may analyze the point cloud and determine (perhaps with a given confidence level) whether an identified scatterer in the environment is stationary or not, possibly by referring to stored information that might indicate whether the identified scatterer is typically stationary. Other examples are possible as well.

Additionally or alternatively, in some implementations, the vehicle system may take into account predefined map data when determining the confidence level for whether the scatterer is stationary. The predefined map data may take the form of a map accessible by the vehicle system. For instance, the vehicle system may download an updated map from a server or may already have stored such a map. In any event, the predefined map data may include a known location of the scatterer. In some examples, the predefined map data may further include an indication of whether the scatterer is a type of scatterer that is typically stationary or not. Furthermore, the vehicle system may refer to the predefined map data to determine whether the scatterer is stationary. In other example, the vehicle system may have access to two different maps with two different time stamps, and may compare the two to determine whether the scatterer has moved or not. Other examples are possible as well.

In some implementations, the vehicle system may take into account remote assistance data when determining the confidence level for whether the scatterer is stationary. For example, the vehicle system may transmit, to a computing device of a remote assistance human operator, a recorded image or video of the scatterer, as well as a request prompting the human operator to view the image or video and determine whether the scatterer is stationary. If the vehicle system then receives from the computing device remote assistance data indicating the human operator's threshold high level of confidence, for instance, the vehicle system may responsively increase the confidence level for the scatterer, perhaps to be above a predefined confidence threshold (e.g., predefined threshold of 90, on a scale of 0 to 100). On the other hand, if the vehicle system receives from the computing device remote assistance data indicating the human operator's threshold low level of confidence (e.g., a confidence level below a predefined threshold), the vehicle system may responsively decrease the confidence level for the scatterer, or perhaps leave the confidence level unchanged.

Other techniques and considerations may also be used to determine the confidence level for whether the scatterer is stationary, in addition to or alternatively to those described above. Variations of the techniques described above are possible as well.

In some implementations, the act of making the determination of the likelihood that the at least one scatterer is stationary with respect to the vehicle based on the radar data may involve making the determination based on Doppler measurements in a single frame of the radar data. For example, the vehicle system may detect one or two scatterers having the same Doppler measurements, and may responsively determine that the one or two scatterers are stationary. Alternatively, that act may involve making the determination based on Doppler measurements in two or more frames of the radar data, either consecutive frames or non-consecutive frames. For example, after range-Doppler compression a comparison of the phase in the output of matched filter i between successive frames, or CPIs. So long as the radar is coherent phase at the output of the matched filters is stable (e.g., no change in phase of the return of the scatterer) if the scene is constant. Therefore, if phase changes, then the scene has changed. By way of example, even millimeters of motion may trigger such a detector.

In implementations where the radar data includes Doppler measurements in two (or more) consecutive frames and the Doppler measurements are estimated to be associated with at least one scatterer, the vehicle system may be configured to consider differences, or a lack of differences, between the Doppler measurements in the consecutive frames to determine information about the scatterer(s) in the environment, such as the likelihood that the scatterer(s) are stationary with respect to the vehicle. In addition, the vehicles system may consider this to perhaps determine information about the vehicle's movement. If the vehicle is stationary, for instance, stationary scatterers may have the same (or approximately the same, e.g., within a predefined threshold value of each other) Doppler measurements between two or more consecutive frames—namely, a Doppler measurements of zero or approximately zero. On the other hand, if the vehicle is moving, stationary scatterers may have the same (or approximately the same) non-zero Doppler measurements between two or more consecutive frames, and the non-zero Doppler measurements may approximately represent the velocity of the vehicle.

Accordingly, the act of the vehicle system making the determination of the likelihood that the at least one scatterer is stationary with respect to the vehicle based on the Doppler measurements in the two consecutive frames may involve the vehicle system making a determination that a change in the Doppler measurements between the two consecutive frames is less than (or equal to) a predefined threshold (e.g., less than a Doppler measurement of 1). If the change is less than a predefined threshold, the vehicle system may determine with a threshold high confidence, or make an absolute determination, that the at least one scatterer is stationary with respect to the vehicle. Whereas, if the change is greater than the predefined threshold, the vehicle system may determine with a threshold high confidence, or make an absolute determination, that the at least one scatterer is not stationary with respect to the vehicle.

In some examples, the vehicle system may determine a change in the magnitude and phase of the scatterer-associated clutter in the two consecutive frames of the radar data, and if the magnitude and phase are both constant (or approximately constant) between the two consecutive frames, the vehicle system may determine that the scatterer is stationary. Other examples are possible as well.

In some implementations, the vehicle system may be configured to determine the likelihood that a scatterer is stationary with respect to the vehicle based on a consideration of Doppler measurements in two or more non-consecutive frames. For example, the vehicle may determine the likelihood based on two Doppler measurements made within a predefined threshold time of each other (e.g., within 0.5 seconds), but that were not necessarily in consecutive frames. As an example of how else the vehicle system may consider non-consecutive frames, the vehicle system may determine the likelihood based on a consideration of the Doppler measurements in every n-th frame in a sliding window fashion, where n is greater than one (e.g., every fourth frame). Other examples are possible as well.

At block 708, method 700 includes in response to the likelihood being at least equal to a predefined confidence threshold, calculating a velocity of the autonomous vehicle based on the radar data from the two or more radar sensors, where the calculated velocity comprises an angular velocity and a linear velocity.

In some implementations, with regard to a single radar sensor, the clutter associated with a stationary scatterer may fall along a manifold that is based on (i) a Doppler measurement of the scatterer, (ii) a velocity of the radar sensor, and (iii) a position of the scatterer relative to the radar sensor (e.g., a distance from the radar sensor to the scatterer in the environment). For example, such clutter may fall along a manifold defined by Equation 1, where d is the Doppler measurement of the scatterer, $v_s$ is the velocity of the radar sensor, and $p_t$ is the position of the scatterer relative to the radar sensor. The velocity and position are vectors in Equation 1, which includes a dot product.

$$d = -v_s \cdot \frac{p_t}{|p_t|} \qquad \text{Equation (1)}$$

Equation 1 may result in a sinusoidal variation of Doppler with an angle between the velocity vector and the scatterer target azimuth. Other example equations are possible as well. The vehicle system locating a stationary scatterer manifold may allow the radar sensor to determine an instantaneous velocity of the radar sensor relative to the environment.

In some implementations, the act of calculating the velocity of the vehicle may involve comparing the respective velocities of the two or more radar sensors and then calculating the velocity based on the comparison. One reason for doing this, for instance, may be because each radar sensor may be moving at a respective different linear velocity depending on whether the vehicle is turning left or right. By way of example, if the vehicle is turning left, a radar sensor mounted on the right side of the vehicle may be moving with a greater linear velocity than a radar sensor mounted near a geometric centerline of the vehicle, which in turn may be moving with a greater linear velocity than a radar sensor mounted on the left side of the vehicle. Further, if the vehicle is turning right, a radar sensor mounted on the left side of the vehicle may be moving with a greater linear velocity than a radar sensor mounted near a geometric centerline of the vehicle, which in turn may be moving with a greater linear velocity than a radar sensor mounted on the right side of the vehicle. By contrast, the respective angular velocities of each sensor may be the same, regardless of which direction the vehicle is turning, as the sensors are mounted to the structure of the vehicle that is turning at the angular velocity.

In some implementations, the act of calculating the velocity based on a comparison of the respective velocities of the two or more radar sensors may involve computing the linear velocity of the vehicle to be an average of the respective linear velocities of the two or more radar sensors.

In an example, before receiving the radar data, and while the vehicle is moving on the road, the vehicle system may cause at least a first and second radar sensor to acquire first and second radar data, respectively, which may together comprise the radar data received as noted with regard to block 702. In such implementations, the act of calculating the velocity of the vehicle based on the radar data from the two or more radar sensors may involve (i) calculating a first velocity based on the first radar data, (ii) calculating a second velocity based on the second radar data, and (iii) calculating a third velocity based on the first and second velocities. In this example, calculating the third velocity based on the first and second velocities may involve averaging the first and second velocities.

In some implementations, the vehicle system may calculate the linear velocity of the vehicle and the angular velocity of the vehicle based on at least two Doppler measurements. For example, the Doppler measurements may include a first Doppler measurement of a first stationary scatterer with respect to a first radar sensor mounted on the vehicle, and a second Doppler measurement of a second, different stationary scatterer with respect to a second radar sensor mounted on the vehicle at a different location than the first radar sensor. In another example, the Doppler measurements may also include a third Doppler measurement of a third stationary scatterer, different from the first and second stationary scatterers, with respect to a third radar sensor mounted on the vehicle at a different location than the first and second radar sensors. In other examples, the at least two Doppler measurements may include at least two Doppler measurements of the same stationary scatterer, which may occur when the stationary scatterer falls within each of the at least two radar sensors' fields of view. Other examples are possible as well.

As a particular example, referring back to FIG. 6, the vehicle system may determine with a threshold high likelihood (e.g., a confidence level that meets or exceeds the predefined confidence threshold) that scatterers 612 and 614 are stationary, but may determine with a threshold low likelihood (e.g., a confidence level that is below the predefined confidence threshold) that scatterer 616 is stationary (i.e., scatterer 616 is moving). For instance, scatterer 616 may be a pedestrian walking across the road. Further, the radar data may include a first Doppler measurement of scatterer 612 with respect to radar sensor 604, as well as a second Doppler measurement of scatterer 614 with respect to radar sensor 606. The vehicle system may thus calculate the linear velocity of the vehicle and/or the angular velocity of the vehicle based on the first and second Doppler measurements.

In some implementations, the vehicle system may calculate the linear velocity of the vehicle and the angular velocity of the vehicle further based on respective positions of the two or more radar sensors from a geometric centerline of the vehicle, such as based on (i) a first distance from a first sensor to the geometric centerline and (ii) a second distance from a second sensor to the geometric centerline. In addition, the vehicle system may calculate the linear velocity of the vehicle and the angular velocity of the vehicle further based on (i) respective positions of two or more stationary scatterers relative to the vehicle (e.g., respective distances from two or more stationary scatterers to the vehicle) and/or (ii) a position of a single stationary scatterer relative to the vehicle (e.g., a distance from the single stationary scatterer to the vehicle).

Furthermore, in these or other implementations discussed above, the clutter associated with a stationary scatterer may fall along a manifold defined by Equation 2, which may be defined with respect to the geometric centerline of the vehicle. In Equation 2, d is the Doppler measurement with respect to a given radar sensor of the two or more radar sensors, $v_r$ is the linear velocity of the vehicle, co is the angular velocity of the vehicle, $p_r$ is the position of the given radar sensor relative to the geometric centerline of the vehicle, and $p_t$ is the position of the scatterer relative to the given radar sensor.

$$d = -(v_r + \omega \times p_r) \cdot \frac{p_t}{|p_t|} \quad \text{Equation (2)}$$

In these implementations, given two different Doppler measurements, the vehicle system may calculate the linear velocity and/or the angular velocity of the vehicle, perhaps using Equation 2, or perhaps using a different type of equation.

In some implementations, the act of calculating the velocity based on a comparison of the respective velocities of the two or more radar sensors may involve using a maximum likelihood estimator (MLE) that is configured to iteratively determine the most-likely values for the linear velocity of the vehicle and/or the angular velocity of the vehicle, based on the radar data (e.g., various Doppler measurements) from the two or more radar sensors. For example, the vehicle system may use the MLE, two different Doppler measurements, and Equation 2 to iteratively determine the most-likely linear velocity and angular velocity.

Moreover, in some implementations the linear velocity and/or angular velocity may be calculated with higher accuracy using radar data acquired from three or more radar sensors.

In some implementations, the vehicle system may receive information including (i) an indication that one or more of the velocity of the vehicle is above a predefined velocity threshold (e.g., 10 meters per second (m/s)) and/or (ii) an indication that a steering angle of the vehicle is above a predefined angle threshold (e.g., 45°). In such implementations, the act of calculating the velocity of the vehicle may be performed in response to receiving this information.

At block 710, method 700 includes controlling the autonomous vehicle based on the calculated velocity.

In some implementations, the act of controlling the vehicle based on the calculated velocity may involve causing a movement module of the vehicle system to adjust a linear velocity of the vehicle. The movement module may take the form of an entity that receives signals from various movement devices such as the IMU and that also manages processing of movement data, such as gyroscope and accelerometer readings. Such a movement module may include the IMU, or may be separate from but communicatively linked to the IMU. Further, the act of causing the movement module to adjust the linear velocity may involve causing the movement module to increase or decrease the linear velocity of the vehicle.

Additionally or alternatively, the act of controlling the vehicle based on the calculated velocity may involve causing a movement module of the vehicle system to adjust a steering angle of the vehicle, such as by increasing or decreasing the current steering angle of the vehicle.

Additionally or alternatively, the act of controlling the vehicle based on the calculated velocity may involve providing, on a display mounted on an interior of the vehicle, an indication of one or more of the calculated angular velocity and the calculated linear velocity of the vehicle. For instance, the vehicle system may display to the user, via a graphical user interface and/or a speedometer, a visual indication of the calculated angular and/or linear velocity.

The act of controlling the vehicle based on the calculated velocity may involve other operations as well, additionally or alternatively to those described above.

Figure 8:
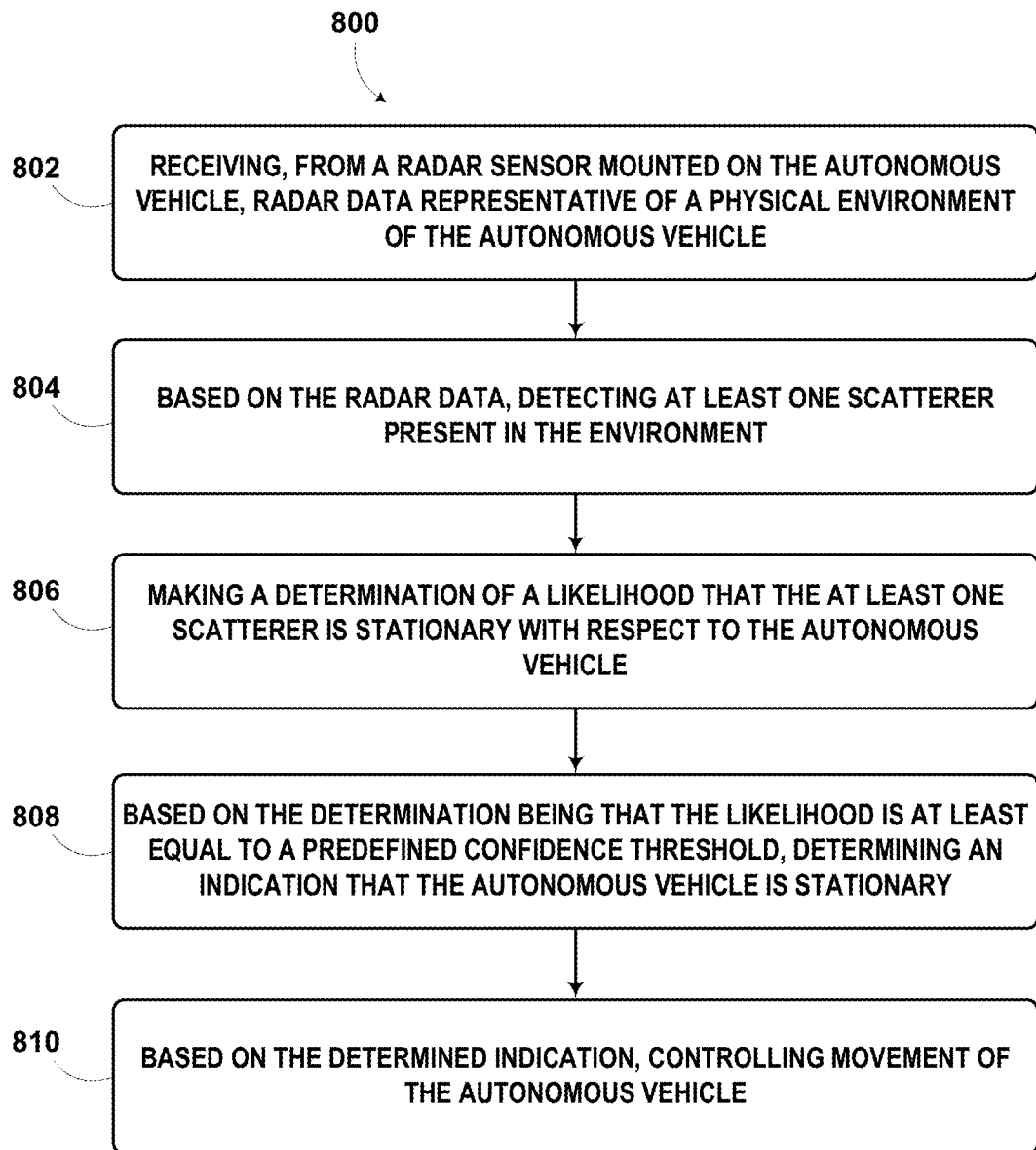
FIG. 8 is a flow chart of a method, according to an example implementation.

FIG. 8 is a flowchart of an example method 800 for vehicle motion detection using radar technology. Method 800 represents an example method that may include one or more operations, functions, or actions, as depicted by one or more of blocks 802, 804, 806, 808, and 810, each of which may be carried out by any of the systems shown in FIGS. 1, 2, 3A, 3B, 4, 5, and 6, among other possible systems. Those skilled in the art will understand that the flowchart described herein illustrates functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may cause a system to perform one or more blocks of method 800.

At block 802, method 800 includes receiving, from a radar sensor mounted on an autonomous vehicle, radar data representative of a physical environment of the autonomous vehicle.

At block 804, method 800 includes based on the radar data, detecting at least one scatterer present in the environment. The act of detecting the at least one scatterer based on the radar data may involve any one or more of the same operations discussed above with regard to block 704 of method 700.

At block 806, method 800 includes making a determination of a likelihood that the at least one scatterer is stationary with respect to the autonomous vehicle. The act of making the determination of the likelihood that the at least one scatterer is stationary with respect to the autonomous vehicle may involve any one or more of the same operations discussed above with regard to block 706 of method 700.

For example, the vehicle system may be configured to use a single frame of Doppler measurements estimated to be associated with the at least one scatterer to determine the likelihood that the at least one scatterer is stationary. In another example, the vehicle system may be configured to use two or more consecutive or non-consecutive frames (e.g., every n-th frame, where n is greater than one) to determine the likelihood that the at least one scatterer is stationary. In particular, if the at least one scatterer is stationary, Doppler measurements that are estimated to be associated with the at least one scatterer may be the same between two or more frames of the radar data.

At block 808, method 800 includes based on the determination being that the likelihood is at least equal to a predefined confidence threshold, determining an indication that the autonomous vehicle is stationary.

The act of determining that the likelihood is at least equal to the predefined confidence threshold may be involve any one or more of the same operations discussed above with regard to block 706 and/or block 708 of method 700. For instance, using the radar data, and perhaps one or more of the other considerations discussed above (e.g., image data, predefined map data), the vehicle system may determine with a threshold high confidence (e.g., a confidence level above a predefined threshold of 95 out of 100) that a given scatterer is stationary.

Further, in line with the discussion above, the vehicle system may be configured to consider differences between the Doppler measurements in two or more consecutive or non-consecutive frames in order to determine information about the vehicle's movement. For example, if the vehicle is stationary, stationary scatterers may have the same (or approximately the same) Doppler measurements among at least one frame, such as (i) two or more consecutive frames and/or (ii) every n-th frame, where n is greater than one. In particular, the stationary scatterers may have Doppler measurements of zero or approximately zero.

Therefore, when the vehicle system has determined that the likelihood that the at least one scatterer is stationary is at least equal to a predefined confidence threshold, the vehicle system may analyze Doppler measurements in multiple frames of the radar data to facilitate high-accuracy movement detection. For instance, if the vehicle is stationary, stationary scatterers may have a Doppler measurement of zero or approximately zero, and thus, if the vehicle remains stationary over two or more frames, the Doppler measurement will remain at zero or approximately zero, or may change to an extent that is below a predefined change threshold. In response to this occurring, the vehicle system may determine that the vehicle is stationary. On the other hand, if the vehicle moves even a small amount (e.g., approximately 1 millimeter or less) over two or more frames, the vehicle system may detect a change in various parameters associated with a stationary scatterer, such as the magnitude and phase of scatterer-associated clutter in the radar data. In some examples, the vehicle system may have a predefined change threshold that is set low (e.g., a change of 0.5) so that when the vehicle moves a small amount, the vehicle system may detect that the change exceeds the predefined change threshold, and thereby determine that the vehicle is not stationary.

The indication that the vehicle is stationary may take various forms. In some implementations, the act of determining the indication that the vehicle is stationary may involve storing in memory an indication (e.g., a flag) that the vehicle is stationary. Additionally or alternatively, the act may involve transmitting, to the movement module of the vehicle system or other component of the vehicle system, the indication that the vehicle is stationary.

Additionally or alternatively, the act may involve providing in the interior of the vehicle a visual indication that the vehicle is stationary, such as an illuminating a light or providing text on a display screen. Additionally or alternatively, in some scenarios, such as when the vehicle is stationary and in park, the act may involve the vehicle system performing other actions, such as unlocking the doors to the vehicle or turning off/dimming the headlights of the vehicle. Other examples are possible as well.

These and other methods of determining the indication may occur after or in conjunction with the vehicle system determining that the vehicle is stationary based on the radar data.

In some implementations, the vehicle system may receive an indication that a velocity of the vehicle is below a predefined velocity threshold. In such implementations, the vehicle system may perform act of determining the indication that the vehicle is stationary in response to receiving the indication that the velocity of the vehicle is below the predefined velocity threshold. For example, if the vehicle system detects that the velocity of the vehicle has dropped below a predefined velocity threshold of 0.2 m/s, the vehicle system may engage in one or more of the operations discussed above to determine whether the vehicle is stationary or not.

At block 810, method 800 includes based on the determined indication, controlling movement of the autonomous vehicle.

In line with the discussion above, the act of controlling the movement of the vehicle may involve providing (e.g., transmitting) to the movement module of the vehicle an instruction that, upon receipt by the movement module, may cause the vehicle to remain stationary. For example, the instruction may take the form of an instruction for the movement module to deny receipt of signals from the IMU (e.g., from the gyroscope and/or from the accelerometer) or from another vehicle component, which may result in the vehicle remaining stationary. Herein, the act of denying receipt of a signal may refer to various actions, such as (i) receiving but not reading the signal (or otherwise ignoring the signal), (ii) preventing receipt of the signal, or (iii) receiving and reading the signal, but not using the signal to cause movement of the vehicle, among other possibilities.

In alternative implementations, however, the instruction may cause the vehicle system to engage in a process to begin moving the vehicle.

Figure 9:
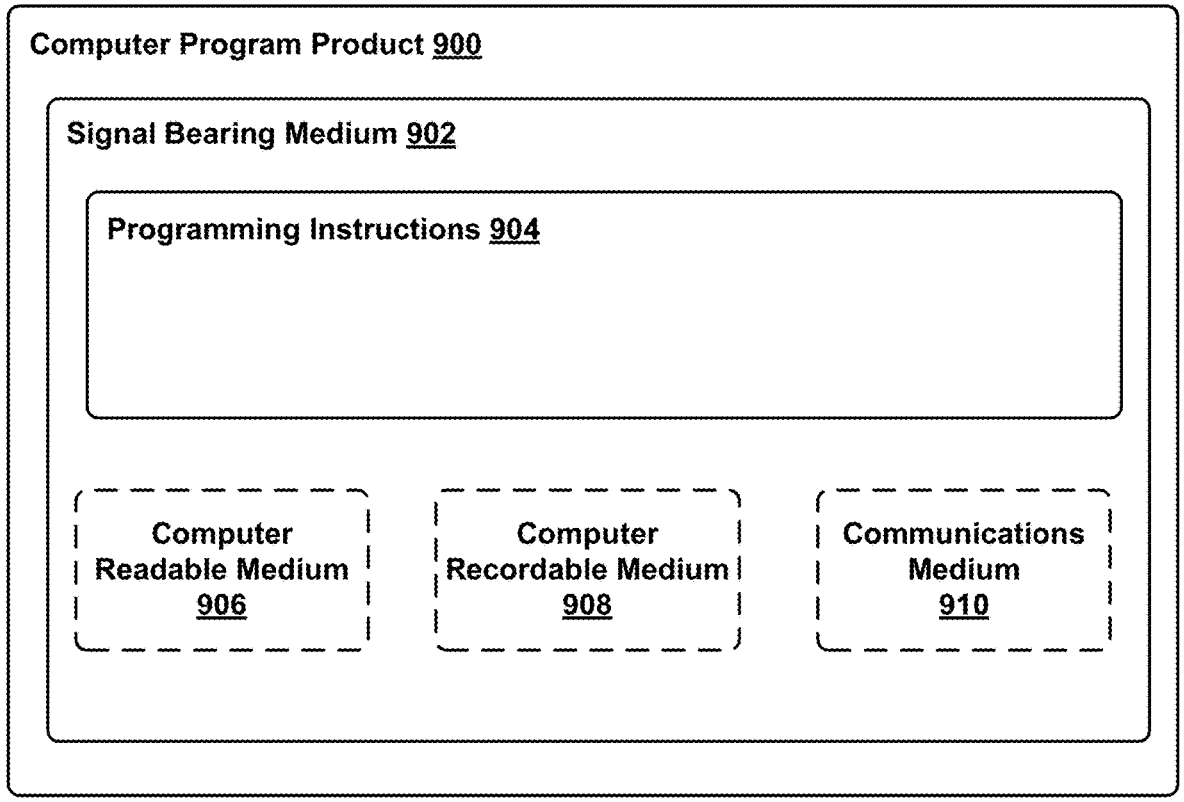
FIG. 9 depicts a schematic diagram of an example computer program.

FIG. 9 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 900 is provided using signal bearing medium 902, which may include one or more programming instructions 904 that, when executed by one or more processors may provide functionality or portions of the functionality described above with respect to FIGS. 1-8. In some examples, the signal bearing medium 902 may encompass a non-transitory computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Similarly, the signal bearing medium 902 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 112 of FIG. 1 may be configured to provide various operations, functions, or actions in response to the programming instructions 904 conveyed to the computer system 112 by one or more of the computer readable medium 906, the computer recordable medium 908, and/or the communications medium 910.

The non-transitory computer readable medium could also be distributed among multiple data storage elements and/or cloud (e.g., remotely), which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method performed by a computing system configured to control an autonomous vehicle, the method comprising:
    while the autonomous vehicle is moving on a road, receiving, by the computing system, from at least one radar sensor, radar data representative of a physical environment of the autonomous vehicle;
    based on the radar data, detecting, by the computing system, at least one scatterer present in the environment; and
    based on a determination of a likelihood that the at least one scatterer is stationary with respect to the autonomous vehicle:
        calculating, by the computing system, a velocity of the autonomous vehicle using at least a portion of the radar data from the at least one radar sensor that represents the at least one scatterer, and
        controlling, by the computing system, the autonomous vehicle based on the calculated velocity of the autonomous vehicle.

2. The method of claim 1, wherein controlling the autonomous vehicle based on the calculated velocity of the autonomous vehicle comprises causing a movement module of the computing system to adjust a linear velocity of the autonomous vehicle.

3. The method of claim 1, wherein controlling the autonomous vehicle based on the calculated velocity of the autonomous vehicle comprises causing a movement module of the computing system to adjust a steering angle of the autonomous vehicle.

4. The method of claim 1, wherein controlling the autonomous vehicle based on the calculated velocity of the autonomous vehicle comprises providing, on a display mounted on an interior of the autonomous vehicle, an indication of the calculated velocity of the autonomous vehicle.

5. The method of claim 1, wherein calculating the velocity of the autonomous vehicle using the radar data from the at least one radar sensor is performed in response to receiving one or more of (i) an indication that the velocity of the autonomous vehicle is above a predefined velocity threshold or (ii) an indication that a steering angle of the autonomous vehicle is above a predefined angle threshold.

6. The method of claim 1, wherein the at least one radar sensor includes a first radar sensor and a second radar sensor, and
    wherein calculating the velocity of the autonomous vehicle is based on a first distance from the first sensor to a geometric centerline of the autonomous vehicle and a second distance from the second sensor to the geometric centerline of the autonomous vehicle.

7. The method of claim 1, wherein the radar data includes first radar data from a first radar sensor of the at least one radar sensor and second radar data from a second radar sensor of the at least one radar sensor, the method further comprising:
    before receiving the radar data, and while the autonomous vehicle is moving on the road, causing, by the computing system, the first and second radar sensors to acquire the first and second radar data,
    wherein calculating the velocity of the autonomous vehicle using the radar data from the at least one radar sensor comprises (i) calculating a first velocity based on the first radar data, (ii) calculating a second velocity based on the second radar data, and (iii) calculating a third velocity based on the first and second velocities, and
    wherein controlling the autonomous vehicle based on the calculated velocity of the autonomous vehicle comprises controlling the autonomous vehicle based on the calculated third velocity.

8. The method of claim 1, wherein detecting the at least one scatterer present in the environment comprises isolating the at least one scatterer from a remainder of the radar data.

9. An article of manufacture including a non-transitory computer-readable medium having stored thereon instructions that, when executed by a processor in a computing system, causes the computing system to perform operations comprising:
    while an autonomous vehicle is moving on a road, receiving, from at least one radar sensor, radar data representative of a physical environment of the autonomous vehicle;
    based on the radar data, detecting at least one scatterer present in the environment; and
    based on a determination of a likelihood that the at least one scatterer is stationary with respect to the autonomous vehicle:

calculating a velocity of the autonomous vehicle using at least a portion of the radar data from the at least one radar sensor that represents the at least one scatterer, and controlling the autonomous vehicle based on the calculated velocity of the autonomous vehicle.

10. The article of manufacture of claim 9, wherein the radar data includes Doppler measurements captured in at least one frame, wherein the determination of the likelihood that the at least one scatterer is stationary with respect to the autonomous vehicle is based on the Doppler measurements in a single frame of the at least one frame.

11. The article of manufacture of claim 9, wherein the radar data includes Doppler measurements captured in two frames, wherein the determination of the likelihood that the at least one scatterer is stationary with respect to the autonomous vehicle is based on the Doppler measurements in the two frames, wherein the Doppler measurements comprise one of amplitude and phase measurements.

12. The article of manufacture of claim 11, wherein the Doppler measurements comprise Doppler measurements that are estimated to be associated with the at least one scatterer, and wherein the determination of the likelihood that the at least one scatterer is stationary with respect to the autonomous vehicle comprises a determination of whether a change in the Doppler measurements between the two frames is less than a predefined threshold, the operations further comprising:

in response to the determination being that the change in the Doppler measurements between the two frames is less than the predefined threshold, determining that the likelihood is at least equal to a predefined confidence threshold, wherein calculating the velocity of the autonomous vehicle based on the determination of the likelihood that the at least one scatterer is stationary with respect to the autonomous vehicle comprises calculating the velocity of the autonomous vehicle based on the determination that the likelihood is at least equal to the predefined confidence threshold.

13. The article of manufacture of claim 11, wherein the two frames are two consecutive frames.

14. The article of manufacture of claim 9, wherein the determination of the likelihood that the at least one scatterer is stationary with respect to the autonomous vehicle is based on image data received from at least one camera mounted on the autonomous vehicle.

15. The article of manufacture of claim 9, wherein the determination of the likelihood that the at least one scatterer is stationary with respect to the autonomous vehicle is based on optical data received from at least one light detection and ranging sensor mounted on the autonomous vehicle.

16. The article of manufacture of claim 9, wherein the determination of the likelihood that the at least one scatterer is stationary with respect to the autonomous vehicle is based on predefined map data accessible by the computing system, wherein the predefined map data includes a known location of the at least one scatterer in the environment.

17. A computing system configured to control an autonomous vehicle, the computing system comprising:

at least one radar sensor;

a processor configured to perform operations comprising:
while the autonomous vehicle is moving on a road, receiving, from the at least one radar sensor, radar data representative of a physical environment of the autonomous vehicle;

based on the radar data, detecting at least one scatterer present in the environment; and based on a determination of a likelihood that the at least one scatterer is stationary with respect to the autonomous vehicle:

calculating a velocity of the autonomous vehicle using at least a portion of the radar data from the at least one radar sensor that represents the at least one scatterer, and controlling the autonomous vehicle based on the calculated velocity of the autonomous vehicle.

18. The computing system of claim 17, wherein the computing system further comprises a movement module, and wherein controlling the autonomous vehicle based on the calculated velocity of the autonomous vehicle comprises causing the movement module to adjust a linear velocity of the autonomous vehicle.

19. The computing system of claim 17, wherein the computing system further comprises a movement module, and wherein controlling the autonomous vehicle based on the calculated velocity of the autonomous vehicle comprises causing the movement module to adjust a steering angle of the autonomous vehicle.

20. The computing system of claim 17, wherein calculating the velocity of the autonomous vehicle using the radar data from the at least one radar sensor is performed in response to receiving an indication that a steering angle of the autonomous vehicle is above a predefined angle threshold.

* * * * *